Patented June 19, 1928.

1,674,168

UNITED STATES PATENT OFFICE.

ERICH FISCHER AND CARL ERICH MÜLLER, OF HOCHST-ON-THE-MAIN, GERMANY, ASSIGNORS TO GRASSELLI DYESTUFF CORPORATION, OF NEW YORK, N. Y., A CORPORATION OF DELAWARE.

PROCESS OF PRODUCING YELLOW DYEINGS ON CELLULOSE ESTERS OR CELLULOSE ETHERS.

No Drawing. Application filed July 19, 1927, Serial No. 207,013, and in Germany July 29, 1926.

It is known to dye acetyl cellulose with mono-sulfonated nitro-diarylamines. These dyestuffs have, however, but a slight affinity for the acetate silk so that they give only very light dyeings.

Furthermore it is known that dyestuffs, obtainable by the action of nitro-diazo compounds upon diphenylamine-sulfonic acid, or of nitrosulfodiazo compounds upon diphenylamine, produce deep dyeings on acetylcellulose. The value of all these dyestuffs, as far as yellow dyestuffs are concerned, is insignificant as they yield dyeings which are either phototrope or only moderately fast to light or acids.

According to the present invention all the above-named disadvantages are obviated by using for the dyeing monosulfonated nitro-arylazodiarylamines containing at least one nitro group in the diarylamine complex. Such dyestuffs are obtained, for instance, by condensing nitro- or dinitrochloro-benzene-sulfonic acid with aminoaryl azo dyestuffs, or by condensing nitro- or dinitro-chlorobenzenes with monosulfonated aminoazo dyestuffs. The finished dyestuffs may even contain some other groups such as, for instance, $NH_2$, $NH.CH_3$ or the like, OH, $OCH_3$ and so on.

The following examples serve to illustrate our invention, but they are not intended to limit it thereto:

(1) 1 kg. of acetate silk is dyed in the usual manner for ¾ to 1 hour at 60° C. to 70° C. in a dyebath containing 20 g. of the dyestuff 4-benzene-azo-2'6'-dinitro-4'-sulfo-diphenylamine of the formula:

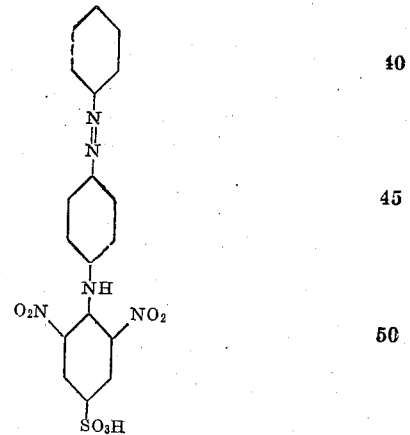

with or without the addition of a salt, an acid, or a protective coloid. The intense golden-yellow dyeing thus produced is distinguished by its excellent properties as to fastness. Furthermore the dyestuff is particularly valuable for the fact that it yields non-phototrope dyeings when combined with other dyestuffs so as to give for instance brown or green tints.

(2) 1 kg. of acetate silk is dyed in the manner indicated in Example 1 with 20 g. of the dyestuff: 4-benzene-azo-4'-nitro-2'-sulfodiphenylamine. The yellow dyeing so obtained has likewise good fastness properties.

By the term "cellulose ethers" we include in the following claims not only the cellulose ethers themselves but also the cellulose esters.

We claim:

1. The process of producing yellow dyeings on cellulose esters by dyeing the fiber with monosulfonated arylazodiarylamines containing at least one nitro group standing in the diarylamine complex.

2. The process of producing yellow dyeings on cellulose esters by dyeing the fiber with 4 - benzene - azo - 2'6'-dinitro-4'-sulfodiphenylamine of the formula:

3. Cellulose materials dyed with monosulfonated arylazodiarylamines containing at least one nitro group standing in the diarylamine complex.

4. Cellulose materials dyed with 4-benzene-azo-2'6'-dinitro-4'-sulfodiphenylamine of the formula:

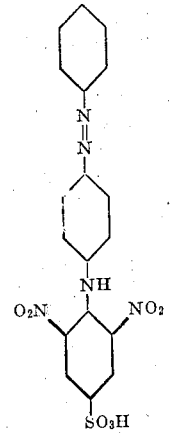

In testimony whereof, we affix our signatures.

ERICH FISCHER.
CARL ERICH MÜLLER.